(12) United States Patent
Jusuf (10) Patent No.: US 11,025,185 B2
(45) Date of Patent: Jun. 1, 2021

(54) ADAPTIVE CONTROL SYSTEM

(71) Applicant: RENESAS ELECTRONICS EUROPE GMBH, Duesseldorf (DE)

(72) Inventor: Suad Jusuf, Duesseldorf (DE)

(73) Assignee: Renesas Electronics Europe GmbH, Duesseldorf (DE)

(*) Notice: Subject to any disclaimer, the term of this patent is extended or adjusted under 35 U.S.C. 154(b) by 0 days.

(21) Appl. No.: 16/463,054

(22) PCT Filed: Nov. 24, 2016

(86) PCT No.: PCT/EP2016/078724
§ 371 (c)(1),
(2) Date: May 22, 2019

(87) PCT Pub. No.: WO2018/095530
PCT Pub. Date: May 31, 2018

(65) Prior Publication Data
US 2019/0280632 A1    Sep. 12, 2019

(51) Int. Cl.
*H02P 21/18*    (2016.01)
*H02P 21/26*    (2016.01)
*H02P 21/00*    (2016.01)

(52) U.S. Cl.
CPC .............. *H02P 21/18* (2016.02); *H02P 21/00* (2013.01); *H02P 21/0017* (2013.01); *H02P 21/26* (2016.02)

(58) Field of Classification Search
CPC ............ G05B 13/00; G05B 11/36; G06F 7/60
See application file for complete search history.

(56) References Cited

U.S. PATENT DOCUMENTS

| | | | | |
|---|---|---|---|---|
| 4,476,954 A | * | 10/1984 | Johnson | B60W 30/18 123/352 |
| 5,495,158 A | * | 2/1996 | Schmidt | H02P 23/16 318/561 |
| 6,037,736 A | * | 3/2000 | Tsuruta | H02P 23/16 318/609 |
| 7,684,879 B2 | * | 3/2010 | Yutkowitz | G05B 13/042 700/28 |
| 9,483,036 B2 | * | 11/2016 | Kaku | H02P 23/12 |

(Continued)

OTHER PUBLICATIONS

Rothengagen, K., et al., "Implementation of Sate and Input Observers for Doubly-Fed Induction Generators," Eurocon, 2007, all enclosed pages cited.

(Continued)

*Primary Examiner* — Said Bouziane
(74) *Attorney, Agent, or Firm* — Burr & Forman LLP (57) ABSTRACT

An adaptive control system (2) for controlling a plant (3) is disclosed. The adaptive control system comprises a control system (5) configured to generate drive signals (16) for the plant in dependence upon a reference signal (8) and an error signal, and a state observer (17) or state sensor (17'; FIG. 2) configured to generate an estimate of a state of the plant in dependence upon the reference signal. The system comprises an error combiner (12) configured to selectably combine a first error (11) determined from the reference signal and a set of measurements of the plant and a second error (13) determined from the reference and the estimate.

23 Claims, 9 Drawing Sheets

(56) References Cited

U.S. PATENT DOCUMENTS

| | | | | |
|---|---|---|---|---|
| 2003/0139824 A1* | 7/2003 | Akamatsu | ............ | G05B 19/251 700/29 |
| 2006/0118170 A1* | 6/2006 | Dykstra | ................ | G05D 24/02 137/92 |
| 2007/0150076 A1* | 6/2007 | Schmidt | ............... | G05B 13/042 700/29 |
| 2015/0212498 A1* | 7/2015 | Kawai | .................... | G05B 19/19 700/42 |

OTHER PUBLICATIONS

Chaoui, H., et al., "Observer-based adaptive control of PMSM's with disturbance compensation and speed estimation," Jun. 1, 2014, all enclosed pages cited.

International Search Report and Written Opinion of PCT/EP2016/078724 dated Jun. 21, 2017, all enclosed pages cited.

* cited by examiner

ADAPTIVE CONTROL SYSTEM

FIELD OF THE INVENTION

The present invention relates to an adaptive control system for controlling a plant.

BACKGROUND

Several approaches are known for controlling a plant in the form of an electric motor.

One approach is field-oriented control (FOC). Although FOC is increasingly being used to control motors in appliances, such as washing machines and fans, it suffers drawbacks. In particular, performance is limited if stator position or other parameters are not known or not known to sufficient precision.

One solution is to provide a sensor to determine the position of the stator. Another solution is to employ adaptive control in which parameters, such as stator position, are estimated using an observer. Model Reference Adaptive Control (MRAC) can be used to create a closed loop controller with parameters which can be updated to change the response of the system. The output of the system is compared with the desired response from a reference model. However, MRAC is still subject to variations in plant parameters and can have difficulty responding to non-linear conditions.

SUMMARY

According to a first aspect of the present invention there is provided an adaptive control system for controlling a plant. The adaptive control system comprises a control system configured to generate drive signals for the plant in dependence upon a reference signal and an error signal and an observer or measurer configured to generate an estimate of a state of the plant in dependence upon the reference signal. The system comprises an error combiner configured to selectably combine a first error determined from the reference signal and a measurement of the plant and a second error determined from the reference and the estimate.

The error combiner may be configured to pre-multiply the first error signal by a first gain and the second error signal by a second gain so as to obtain first and second amplified error signals respectively and to add the first and second amplified error signals to obtain the third signal.

In a first or second enhanced mode, the error combiner is configured to set the first and second gains to respective non-zero, positive values.

In the first enhanced mode, the first and second gains may be equal. The first and second gains may be equal to one.

In the second enhanced mode, the first gain may be equal to or greater than one, the second gain may be equal to or greater than one, and the first gain and/or the second gain may be greater than one.

The control system may comprise a field-orientated control (FOC) system which comprises a speed regulator.

The observer or measurer may comprise a signal-based model reference adaptive control (MRAC) speed observer.

The first error may be determined from a speed reference $\omega_R$ and a plant speed $\omega_P$. The second error may be determined from a speed reference $\omega_R$ and a speed estimate $\omega_E$.

According to a second aspect of the present invention there is provided an integrated circuit comprising a CPU sub-system and a peripheral module configured to provide an adaptive control system.

The integrated circuit may be a microcontroller or a system-on-a-chip (SoC).

According to a third aspect of the present invention there is provided system comprising a plant and an adaptive control system or an integrated circuit arranged to control the plant.

The system may be a vehicle. The vehicle may be an aerial vehicle, such as an unmanned aerial vehicle (or "drone"). The vehicle may be a ground vehicle, such as a motor vehicle. The motor vehicle may be a motorcycle, an automobile (sometimes referred to as a "car"), a minibus, a bus, a truck or lorry powered, at least in part, by one or more electric motors. The vehicle may be a train or a part of a train, such as a locomotive, railway car or multiple unit.

The system may be an industrial system, such as a robot for use in manufacture, or a 3D printer The system may be an appliance, such as a domestic appliance, a heating, ventilation and air conditioning (HVAC) appliance or power tool such as drill.

The system may further comprise a inverter for the plant. The system may include a gate driver for the inverter.

The plant may be or comprise a brushless DC motor, a permanent-magnet synchronous motor or an AC induction motor.

According to a third aspect of the present invention there is provided a method of controlling a plant, the method comprising generating drive signals for the plant in dependence upon a reference signal and an error signal, generating an estimate of a state of the plant in dependence upon the reference signal, and selectably combining a first error signal determined from the reference signal and a set of measurements of the plant and a second error signal determined from the reference and the estimate so as to produce a third error signal which is provided as the error signal.

The method may be implemented in hardware, for example, as a peripheral module in a microcontroller or SoC.

According to a fourth aspect of the present invention there is provided a hardware circuit configured to perform the method.

According to a fifth aspect of the present invention there is provided a computer program comprising instructions which, when executed by a computer, causes the computer to perform the method.

According to a sixth aspect of the present invention there is provided a computer program product comprising a machine-readable medium storing thereon the computer program. Preferably, the machine-readable medium is non-transitory.

BRIEF DESCRIPTION OF THE DRAWINGS

Certain embodiments of the present invention will now be described, by way of example, with reference to the accompanying drawings, in which.

DETAILED DESCRIPTION OF CERTAIN EMBODIMENTS

In the following, like reference numerals refer to like features.

Observer-Based Adaptive Control System 2

Figure 1:
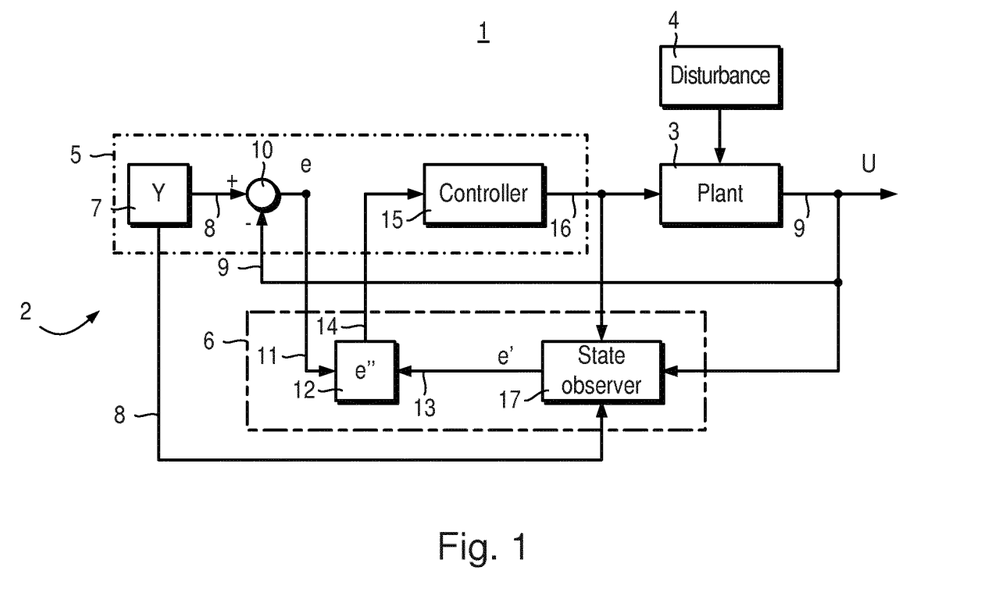
FIG. 1 is a schematic block diagram of a plant system which includes a first adaptive control system which includes a summer, a controller, a state observer and an error combiner which combines a first, feedback error with a second error from the state observer.

Referring to FIG. 1, a plant system 1 is shown. The plant system 1 includes a first adaptive control system 2, a plant 3 which is subject to source(s) 4 of disturbance and which is controlled by the first adaptive control system 2.

The adaptive control system 2 includes a base control system 5 (herein referred to simply as a "control system") and a reference system 6 which is able to provide an independent model of the state of the plant 3.

A reference signal source 7 provides a reference signal 8 (which may also be referred to as a "target signal" or "input signal") for the adaptive control system 2. The plant 3 output is expressed in terms of a response signal 9 (herein referred to as a "state signal" or "output signal").

The adaptive control system 2 includes a summing junction 10, which compares the reference signal 8 and the response signal 9 to generate a first error signal 11, and an error combiner 12, which selectively combines the first error signal 11 and a second error signal 12 to provide a third error signal 14. The third error signal 14 is supplied to a controller 15 which generates a corresponding drive signal 16. The drive signal 16 is supplied to the plant 3 and to a state observer 17. The state observer 17 generates the second error signal 13 according to a model of the plant 3, the reference signal 8 and the plant state signal 9.

The error combiner 12 pre-multiplies the first and second error signals 11, 13 by respective gains, $K_{G1}$, $K_{G2}$ to obtain respective first and second amplified error signals and add the amplified error signals to obtain the third signal 14.

The value of one gain may be set to zero and the value of the other gain may be set to unity, thereby effectively selecting only one of the error signals 11, 13 and so the third error signal 14 consists solely of the first or second error signal 11, 13.

The values of both gains may be set to have non-zero, positive values, preferably equal to or greater than one.

In a first enhanced mode, the respective values of both gains may be set to unity and so the combiner 12 sums the first and second error signals 11, 13 to obtain the third signal 14. This can improve the response of the system 1 such as, for example, to provide faster response to a step change in reference signal (herein referred to as "step response") and to provide dynamic behaviour. In a second enhanced mode, one or both values of gain are greater than one. This can improve the response of the system 1 even further such as, for example, providing even faster step response.

A system state observer 17 need not be used. Instead, a different, source of supplementary error value may be used.

Measurement-Based Adaptive Control System 2

Figure 2:
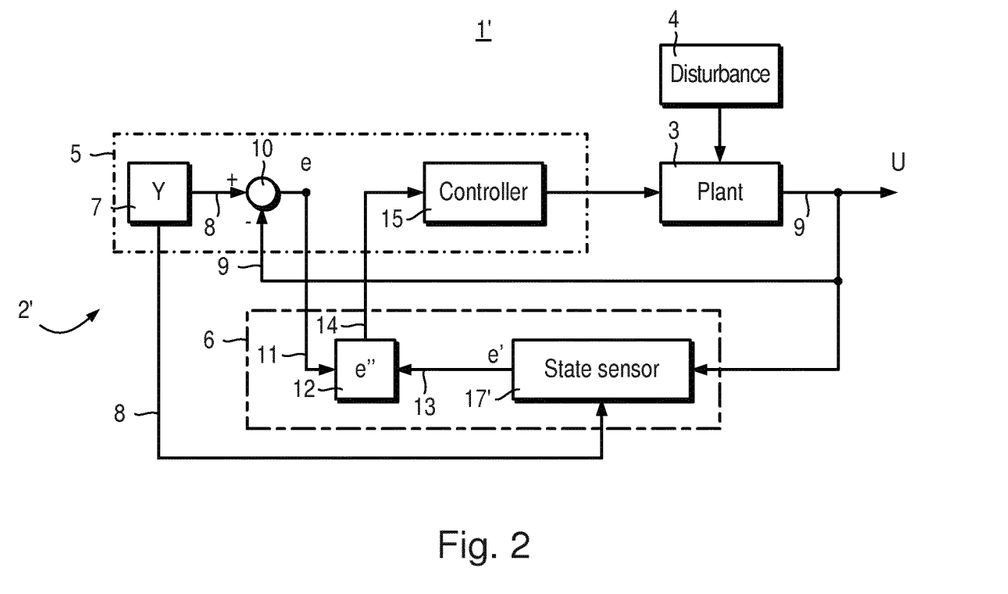
FIG. 2 is a schematic block diagram of a plant system which includes a second adaptive control system which includes a summer, a controller, a state sensor and an error combiner which combines a first, feedback error with a second error from the state sensor.

Referring to FIG. 2, a variant plant system 1' is shown. The variant plant system' 1 is the same as the first plant system 1 except that it has a second adaptive control system 2' which includes a state sensor 17' instead of a state observer 17.

Modes of Control

The plant system 1, 1' may employ an enhanced mode constantly while controlling a plant 3.

Figure 3:
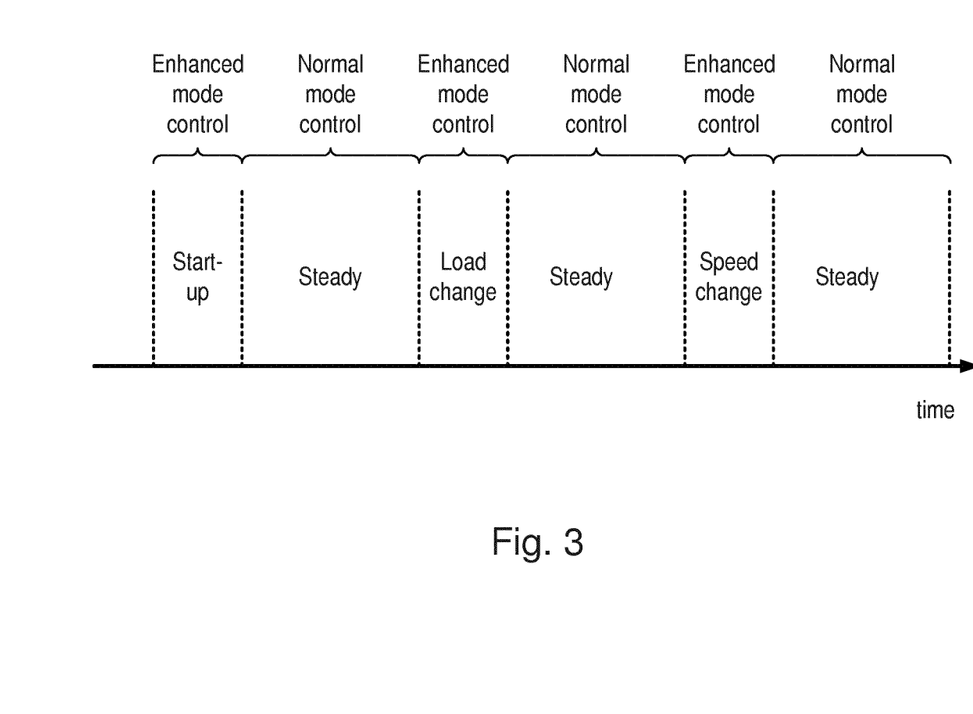
FIG. 3 illustrates switching of an adaptive control system between enhanced mode of control and a normal mode of control.

Referring also to FIG. 3, the plant system 1, 1' switch between a normal mode of control, for example field-oriented control (FOC), and an enhanced mode of control depending on the requirements of the system. For example, an enhance mode of control may be used during start up, when there is a change in load or other form of disturbance, and/or when there is a change in speed, torque or the like.

The first and second values of gains $K_{G1}$, $K_{G2}$ can be set to predefined values or be varied dynamically. Values generally depend on reaction/response ability of the plant and the function of the control system.

Signal-Based MRAC Speed Observer FOC Control System

Figure 4:
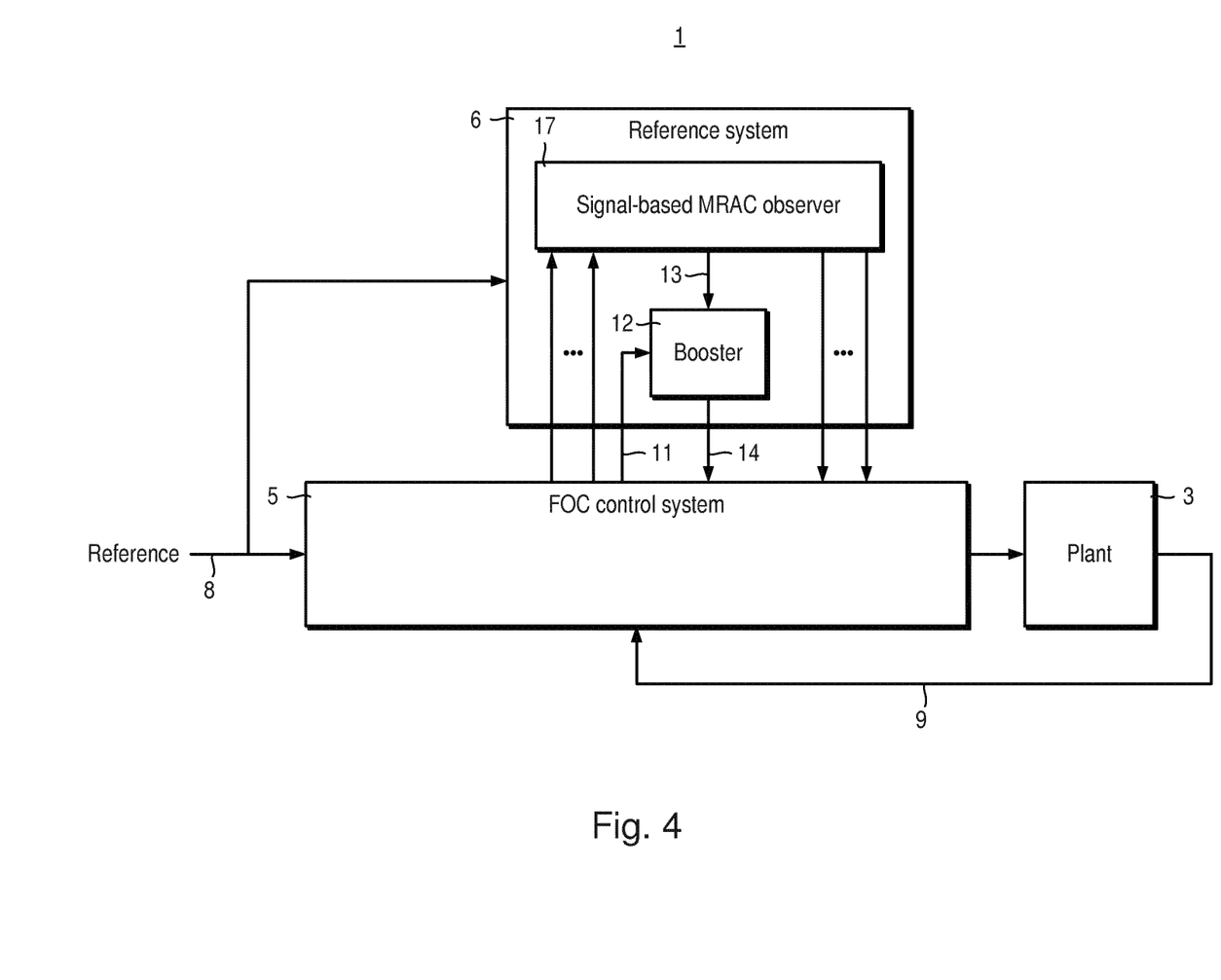
FIG. 4 is a schematic block diagram of an adaptive control system comprising a field-orientated control module and a signal-based model reference adaptive control speed observer which includes adaptive error amplifier.

Referring to FIG. 4, an example of an observer-based adaptive control system 2 and plant 3 is shown.

The plant 3 can take the form of a three-phase ac motor, such as a permanent magnet synchronous motor (PMSM).

The base control system 5 takes the form of a field-oriented control (FOC) system and the state observer 17 takes the form of a signal-based model reference adaptive controller (MRAC) speed observer.

The signal-based MRAC speed observer 17 receives measured currents and voltages and outputs a speed estimate $\hat{\omega}_e$ and an angle estimate $\theta$, namely:

$$\hat{\omega}_e = \left(K_p + \frac{Ki}{s}\right)\left[\hat{i}_q \cdot i_d - \hat{i}_d \cdot i_q + \frac{\varphi}{L}(\hat{i}_q - i_q)\right] \quad (A)$$

and $$\theta = \int_o^t \hat{\omega}_e dt \quad (B)$$

where $K_p$ is proportional gain, $K_i$ is integral gain, $1/s$ is transform function of the integral, $\hat{i}_q$ is adaptive current of the q-axis, $\hat{i}_d$ is adaptive current of the d-axis, $\varphi$ is calculated magnetic flux angle and $L$ is inductance.

The reference system 6 receives a reference speed and an actual plant speed, as well as speed estimate from the signal-based MRAC speed observer 17, and outputs a speed error.

In particular, the error combiner 12 (which is referred herein as an "adaptive error amplifier" or "booster") receives a first error 11 from the FOC system 5, a second error 12 from the signal-based MRAC speed observer 17 and supplies a third error 14 to the FOC system 5.

The first error 11 is the error $e_{RP}$ between the reference speed $\omega_R$ and the plant speed $\omega_P$, namely:

$$e_{RP} = \omega_R - \omega_P \quad (1)$$

The second error 12 is the error $e_{RE}$ between the reference speed $\omega_R$ and the estimated plant speed $\omega_E$, namely:

$$e_{RE} = \omega_R - \omega_E \quad (2)$$

The first error 11 alone can be used in a standard FOC mode and the second error 12 alone can be used in a standard MRAC mode.

The first and second errors 11, 12 can, however, be combined, in a first enhanced mode (or "simple boost mode"), by simply adding the errors 11, 12 namely:

$$e_{T1} = \Sigma e_s = e_{RP} + e_{RE}$$

and, in a second enhanced mode, by:

$$e_{T2} = K_{G1} \cdot e_{RP} + K_{G2} \cdot e_{RE} \quad (4)$$

where $K_{G1} = f(e_{RP}, \omega_P)$ and $K_{G2} = f(e_{RE}, \omega_E)$ and are real, positive or negative numbers, having a magnitude greater than zero, i.e. wherein $|K_{G1}| \geq 0$ and/or wherein $|K_{G2}| \geq 0$, preferably having a magnitude equal to or greater than one, i.e. preferably wherein $|K_{G1}| \geq 1$ and/or preferably wherein $|K_{G2}| \geq 1$. Both $K_{G1}$ and $K_{G2}$ may be positive. One of $K_{G1}$ and $K_{G2}$ may be positive and the other may be negative. Both $K_{G1}$ and $K_{G2}$ may be negative.

The first enhanced mode can help to improve step response and dynamic behaviour. The second enhance mode can help to improve even further step response and dynamic behaviour and also provide the ability to control the system in real time, for example, to respond to sudden changes in operating conditions.

Details of Signal-Based MRAC Speed Observer FOC Control System

Figure 5:
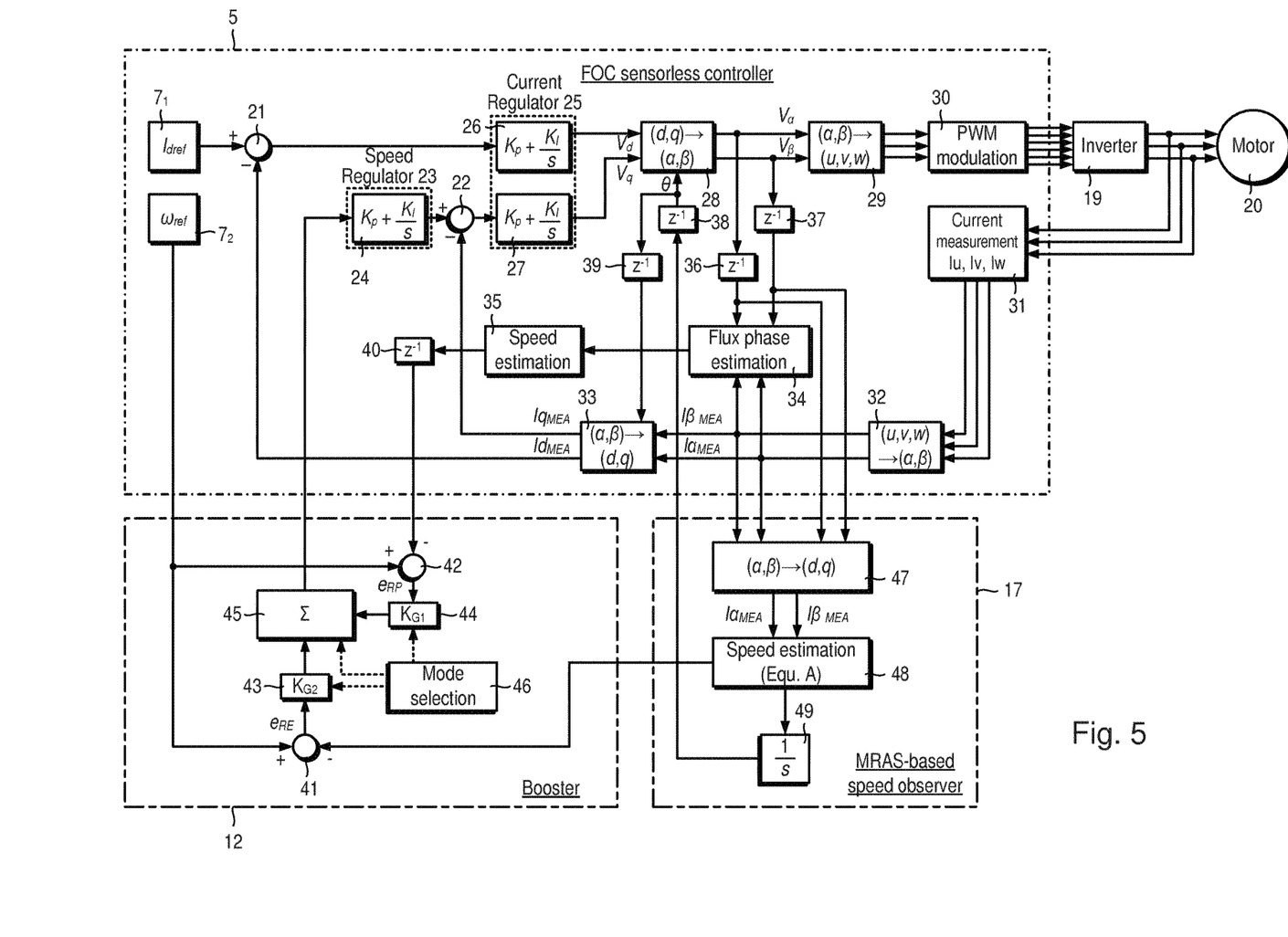
FIG. 5 is a more detailed schematic block diagram of the adaptive control system shown in FIG. 4.

Referring also to FIG. 5, the observer-based adaptive control system 2 is shown in more detail. The system 2 includes the FOC controller 5 which drives via a gate driver 18 (not shown in FIG. 5), an inverter 19 which drives a three-phase motor 20.

First and second sources $7_1$, $7_2$ provide a flux reference current $I_{dref}$ which sets the rotor magnetising flux (not shown) and a rotor reference speed $\omega_{ref}$ respectively.

The FOC controller 5 includes first and second summing junctions 21, 22, a speed controller 23 comprising a proportional-integral (PI) controller 24, a current controller 25 comprising d-axis and q-axis PI controllers 26, 27, an inverse-Park transform module 28, an inverse Clark transform module 29, a pulse width modulation (PWM) modulator 30, a three-phase current measurement block 31, a Clark transform module 32, a Park transform module 33, a flux phase estimation module 34, a speed estimation module 35 and sample-and-hold circuits 36, 37, 38, 39, 40.

The booster 12 includes first and second summing junctions 41, 42, first and second multiplication modules 43, 44 and a summing module 45. The first and second multiplication modules 43, 44 and a summing module 45 are controlled by a mode selector 46.

The speed observer 17 includes a Park transform module 47, a speed estimation module 48 and an integrating module 49.

The reference current $I_{dref}$ and a measured current $I_{qMEA}$ are supplied to the first summing junction 21 to provide an error in the d-axis current component $I_d$. The $I_d$ error is supplied to the d-axis current PI controller 26 to produce a d-axis voltage $V_d$, i.e. voltage corresponding to the magnetic flux density in the rotating d-q coordinate system (or "frame"). The d-axis current PI controller 26 and the q-axis PI controller 27 supply d-axis voltage $V_d$ and the q-axis voltage $V_q$ (i.e. the voltage corresponding to the rotor torque in the rotating d-q coordinate system) respectively to the inverse Park transformation module 28. The inverse Park transformation module 28 also receives rotor position $\theta$ from the speed observer 17.

The inverse Park transformation module 28 converts the outputs of the current regulators 26, 27, from the rotating coordinate system to the stationary coordinate system, and outputs voltages $V_\alpha$, $V_\beta$ in the stationary $\alpha$-$\beta$ frame. The inverse Park transformation module 28 supplies the two-phase quadrature voltages $V_\alpha$, $V_\beta$ to the inverse Clark transform module 29 which converts from the two-axis reference frame to a three-axis reference frame and outputs three-phase voltages $V_U$, $V_V$, $V_W$ to the PWM modulator 30. The two-phase quadrature voltages $V_\alpha$, $V_\beta$ are also passed, via respective sample-and-hold circuits 36, 37, to the flux phase estimation module 34.

The PWM modulator 30 generates, for example using space vector modulation (SVM) techniques, inverter control signals for switches (not shown) in the inverter 19.

The current measurement block 31 provides feedback for closed loop control. Current measurement may employ one, two or three shunt resistors (not shown). The measurements are supplied to the Clark transform module 32 which outputs stator-referenced, two-phase measured currents $I_{\alpha MEA}$ and $I_{\beta MEA}$ which are passed to the flux estimation module 34 and to the Park transform module 33, as well as to a Park transform module 46 in the speed observer 17.

The Park transform module 33 outputs d-axis and q-axis components of two-phase measured current values $I_{dMEA}$, $I_{qMEA}$ in the d-q coordinate system. The d-axis component current $I_{dMEA}$ is supplied to the first summing unit 21 as the subtrahend and is used to calculate the error in the d-axis current component $I_d$. The q-axis component current $I_{qMEA}$ is supplied to the second summing junction 22 as the subtrahend.

The Park transform module 47 in the speed observer 17 outputs d-axis and q-axis components of two-phase measured current values $I_{dMEA}$, $I_{qMEA}$ in the d-q coordinate system and supplies the values to the speed estimation module 48.

The estimated rotational speed $\hat{\omega}_e$ is supplied to the integrating module 49. The integrating module 49 integrates estimated speed $\hat{\omega}_e$ to provide the required rotor position $\theta$, which is supplied, via a third sample-and-hold circuit 38, to the inverse Clarke transform module 28. The required rotor position $\theta$ is also supplied via a fourth sample-and-hold circuit 39 to Park transform module 33.

The estimated rotational speed $\hat{\omega}_e$ is also supplied to the first summing junction 41 in the booster 12 as the subtrahend for the reference rotational speed $\omega_{ref}$ to calculate the second error $e_{RE}$. The second error $e_{RE}$ is supplied to the first multiplying module 43 which multiplies the error by gain $K_{G2}$.

The speed estimator 35 outputs a rotational speed $\omega_P$ which is passed, via a fourth sample-and-hold module 40, to the second summing junction 42 as the subtrahend for the reference rotational speed $\omega_{ref}$ to calculate the first error $e_{RP}$.

The first error $e_{RP}$ is supplied to the second multiplying module 44 which multiplies the error by gain $K_{G1}$.

The first and second errors $K_{G1} \cdot e_{RP}$, $K_{G2} \cdot e_{RE}$ are summed by summing module 45. The error is supplied to the speed PI controller 24. The output of the speed PI controller 24 is supplied to the second summing junction 22. The output of the second summing junction 22 is supplied to the second PI current controller 27.

Experimental Results

To evaluate the observer-based adaptive control system 2, a conventional FOC system (not shown) and the observer-based adaptive control system 2 are used to control a Nanotec® DB42S03 Brushless DC motor.

Figure 6A:
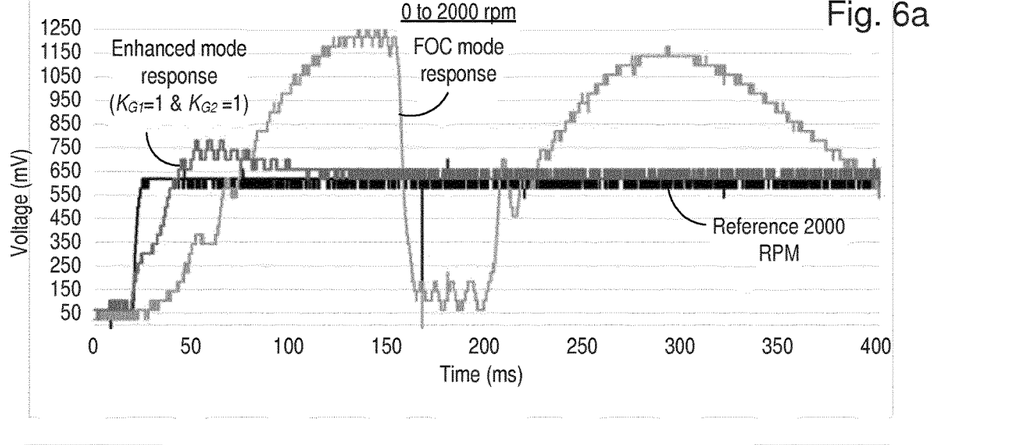
FIGS. 6a, 6b and 6c show measured responses of a brushless DC motor when controlled by a FOC system and an embodiment of an adaptive control system in accordance with the present invention.

Referring to FIG. 6a, in a first test, each control system switches rotation speed from 0 rpm to 2000 rpm with no load and the response of the motor is measured using an oscilloscope (not shown).

Using the conventional FOC system, the motor exhibits a step response time (i.e. the time taken for the motor to reach the reference speed) of 66.84 ms. Using the observer-based adaptive control system 2 (with $K_{G1}$=1 and $K_{G2}$=1), the motor exhibits a step response time of 40.12 ms.

Figure 6B:
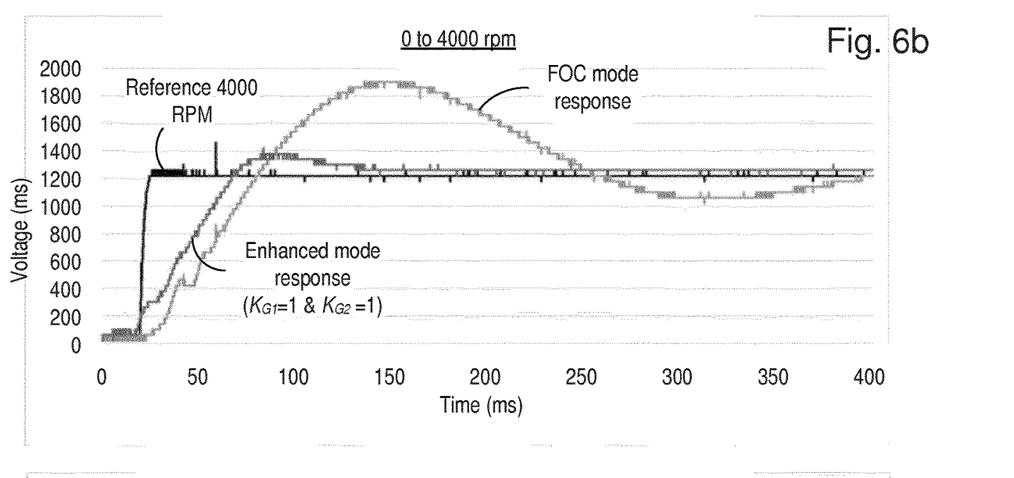

Referring to FIG. 6b, in a second test, each control system switches rotation speed from 0 rpm to 4000 rpm, again with no load. The response of the motor is measured using an oscilloscope (not shown).

Using the conventional FOC system, the motor exhibits a step response time of 82.04 ms. Using the observer-based adaptive control system 2 (with $K_{G1}$=1 and $K_{G2}$=1), the motor exhibits a step response time of 650.64 ms.

Figure 6C:
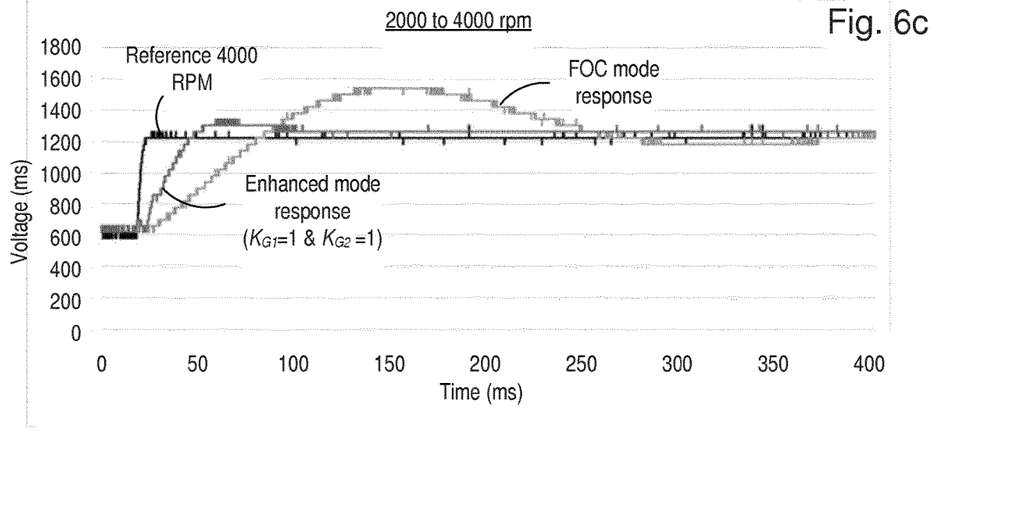

Referring to FIG. 6c, in a third test, each control system switches rotation speed from 2000 rpm to 4000 rpm with no load and the response of the motor is measured using an oscilloscope (not shown).

Using the conventional FOC system, the motor exhibits a step response time of 78.84 ms. Using the observer-based adaptive control system 2 (with $K_{G1}$=1 and $K_{G2}$=1), the motor exhibits a step response time of 47.32 ms.

Implementation

The adaptive control system 2 can be implemented in hardware, software or a combination of hardware and software.

Figure 7:
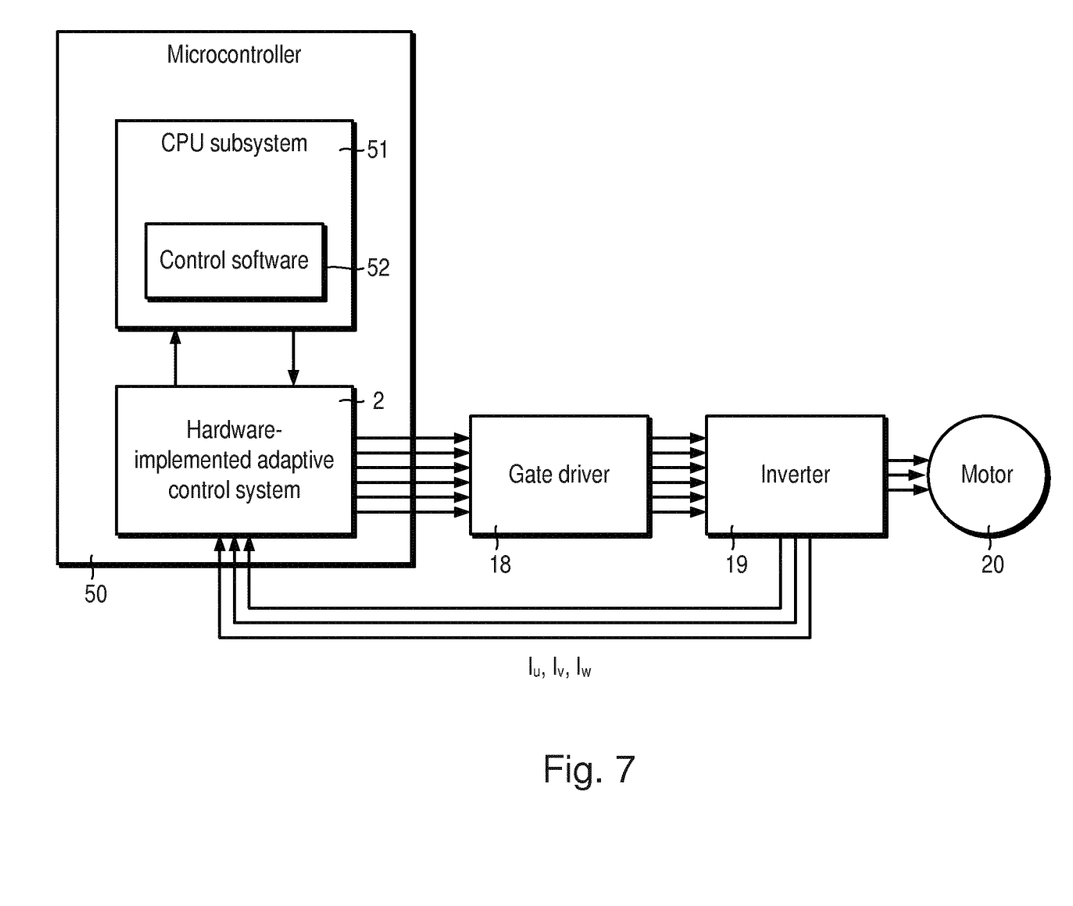
FIG. 7 is a schematic block diagram of an implementation of an adaptive control system as a peripheral module in a microcontroller.

Referring to FIG. 7, a first implementation of the adaptive control system 2 (FIG. 1), 2' (FIG. 2) using a microcontroller 50 is shown.

The microcontroller 50 includes a CPU subsystem 51 comprising at least one central processing unit (CPU) (not shown) and volatile memory (not shown), and peripheral modules (not shown) including, for example, serial ports (not shown), I/O ports (not shown), analogue-to-digital converter(s) 53 (FIG. 8) and timers (not shown), and optional non-volatile memory (not shown).

The adaptive control system 2 is implemented as a peripheral module under the control of application software 52 running on the CPU subsystem 51.

Outputs from the adaptive control system 1, for example the outputs of the PWM module 30 (FIG. 5), can be supplied to a gate driver 18 to provide control signals having sufficient current or power to drive switches (not shown) for example in the form of power transistors (not shown) in the inverter 19.

Figure 8:
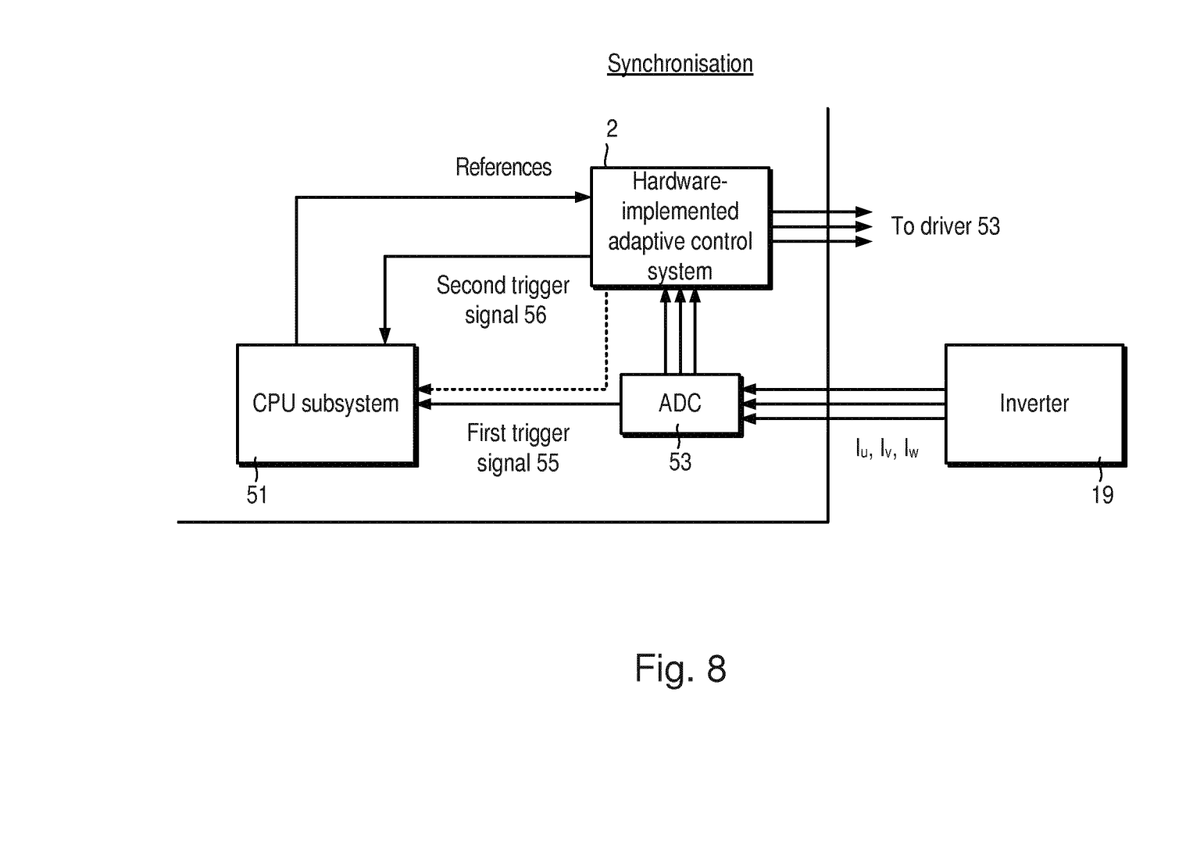
FIG. 8 is a schematic block diagram of an example of an arrangement for synchronising a hardware-implementation of an adaptive control system and control software in a microcontroller.

Referring also to FIG. 8, synchronisation between the adaptive control system 2 and control software 52 is provided by two or more triggers 55, 56.

A first trigger 55 can take the form of the start of calculation based on a latest-available system values (i.e. currents). This can be provided by, for example, determining the end of conversion by an ADC 54 of measured currents. The trigger 55 can be provided by the ADC 54 or by the adaptive control system module 2. A second trigger 56 can be generated by the adaptive control system module 2 once an estimated speed calculation has been completed.

The outcome trigger 56 can be used as an interrupt source or start signal for direct transfer control unit (not shown) or direct memory access (not shown) to transfer the result directly to a register (not shown) in the microcontroller and/or to provide it as a system variable in memory in the microcontroller without CPU load.

The mode selector 46 (FIG. 5) may be implemented by the adaptive controller 2 automatically (i.e. without the need for user direction) and/or by the control software 52 automatically. If implemented by the control software 52, the software 52 may be programmed to switch into different modes according to predefined operations (e.g. start and stop) and/or in response to a trigger, such as exceeding an upper limit or falling below a lower limit of a plant parameter and/or exceeding an upper limit or falling below a lower limit of a rate of change of a plant parameter. The mode selector 46 may be latch and stay in an enhanced mode for a given time, e.g. 500 ms, in response to the trigger.

Figure 9:
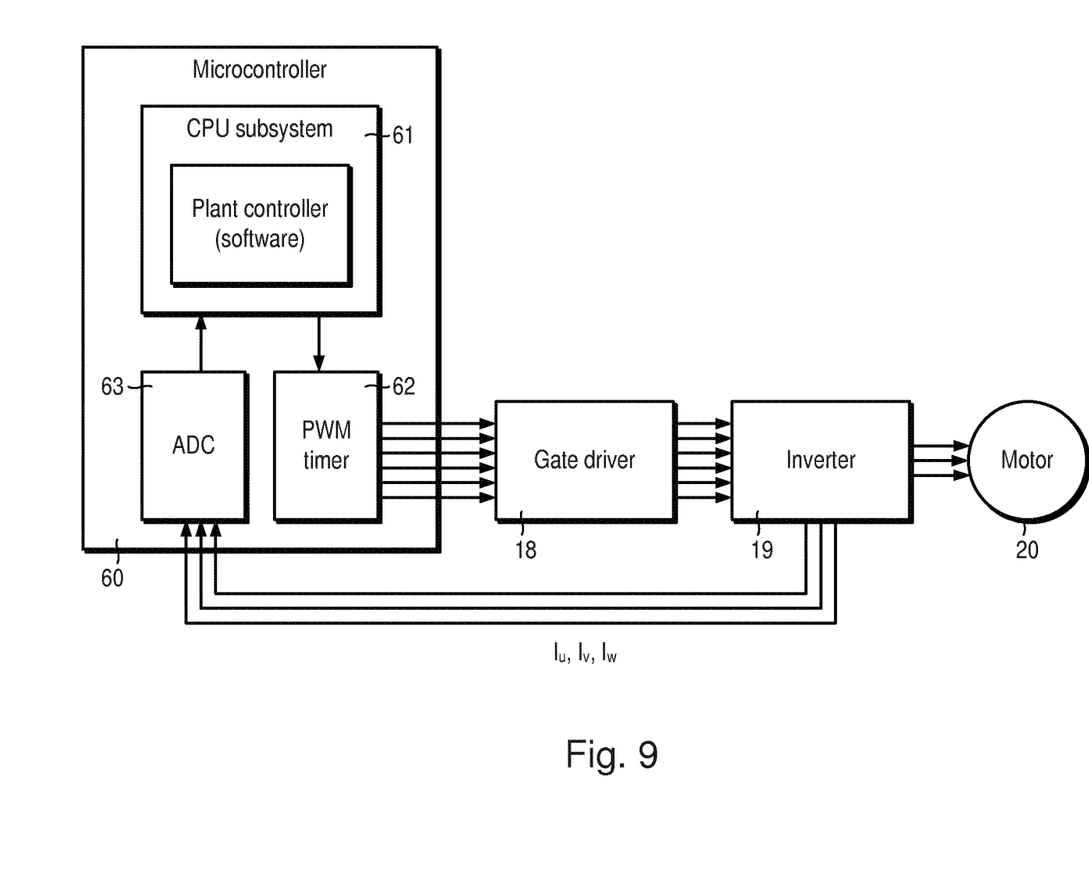
FIG. 9 is a schematic block diagram of an implementation of an adaptive control system in software in a microcontroller.

Referring to FIG. 9, a second implementation of the adaptive control system 2 (FIG. 1), 2' (FIG. 2) using a microcontroller 60 is shown.

The microcontroller 60 includes a CPU subsystem 61 comprising at least one central processing unit (CPU) (not shown) and volatile memory (not shown), and peripheral modules (not shown) including, for example, serial ports (not shown), I/O ports (not shown), analogue-to-digital converter(s) 63 and timers 64, and optional non-volatile memory (not shown).

The adaptive control system 2 is implemented in software 62 running on the CPU subsystem 61.

The mode selector 46 (FIG. 5) may be implemented by the adaptive controller 2 automatically (i.e. without the need for user direction) and/or by the control software 62 automatically. The controller 62 may be programmed to switch into different modes according to predefined operations (e.g. start and stop) and/or in response to a trigger, such as exceeding an upper limit or falling below a lower limit of a plant parameter and/or exceeding an upper limit or falling below a lower limit of a rate of change of a plant parameter. The mode selector 46 may be latch and stay in an enhanced mode for a given time, e.g. 500 ms, in response to the trigger.

Plant System

Figure 10:
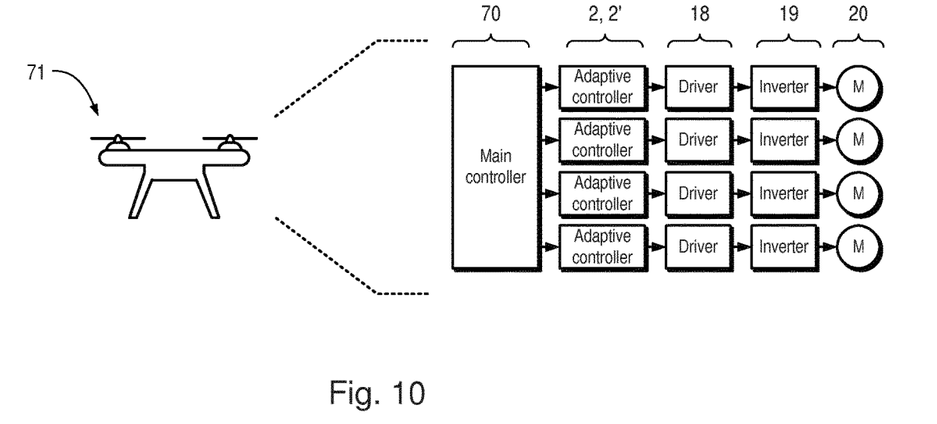
FIG. 10 illustrates a plant system in the form of an autonomous aerial vehicle employing adaptive control systems in accordance with the present invention.
Figure 11:
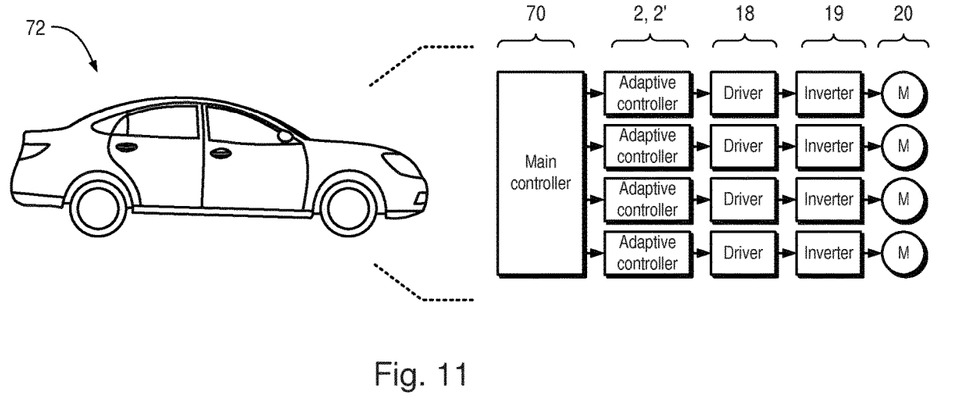
FIG. 11 illustrates a plant system in the form of a motor vehicle employing adaptive control systems in accordance with the present invention.
Figure 12:
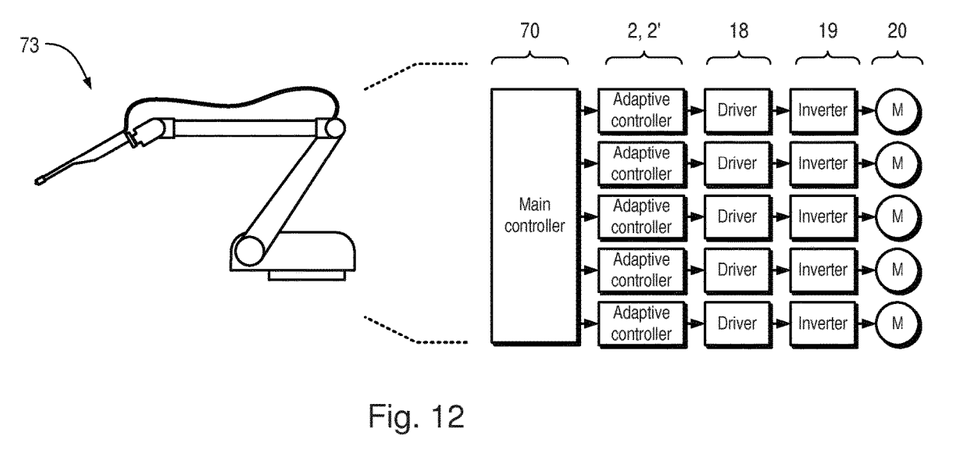
FIG. 12 illustrates a plant system in the form of an industrial robot employing adaptive control systems in accordance with the present invention.

Referring to FIGS. 10, 11 and 12, the adaptive control system can be used several different types of consumer, automotive or industrial system 71, 72, 73.

Referring in particular to FIG. 10, one, two, three, four, five, six or more motors 20 of an unmanned aerial vehicle 71 (commonly referred to as a "drone") may be controlled by a corresponding number of adaptive controllers 2.

Referring in particular to FIG. 11, one, two, three, four or more motors 20 of an automobile 72 may be controlled by a corresponding number of adaptive controllers 2.

Referring in particular to FIG. 12, one, two, three, four, five or more motors 20 of an automobile 73 may be controlled by a corresponding number of adaptive controllers 2.

In each case, each motor 20 is provided with a respective adaptive controller 2. Each adaptive controller may be provided by a respective microcontroller 50 (FIG. 7), 60 (FIG. 9) or may be provided by a single microcontroller 50 (FIG. 7), 60 (FIG. 9) which implements more than one adaptive controller 2 (in hardware and/or software)

The adaptive controllers 2 may be controlled by a main controller 70, for example, in the form a microcontroller running control software. Thus, in some cases, a single microcontroller can be used not only to provide the main controller 70, but also the adaptive controllers 2.

Modifications

It will be appreciated that various modifications may be made to the embodiments hereinbefore described. Such modifications may involve equivalent and other features which are already known in the design, manufacture and use of adaptive control systems and state observers and component parts thereof and which may be used instead of or in addition to features already described herein. Features of one embodiment may be replaced or supplemented by features of another embodiment.

MRAC need not be used, but other forms of state observer can be used, such as a Luenberger observer or a Kalman observer.

Other forms of observer can be additionally or alternatively used, such as a torque observer or current observer.

The adaptive controller can be used to control a motor in an industrial or domestic appliance, device or system (or "product"), such as a pump, a power tool, a home appliance (such as a washing machine or dish washer), an air conditioner, a driver or a robot.

The adaptive controller can be used to control a motor in an automotive device or system, such as a fuel pump, water pump, fan or e-drive system.

The adaptive controller can be used to control a motor in a consumer product, such as a camera, an e-bike, a pedelec, or a drone.

The motor may be a two-phase motor, such as a universal motor, a DC motor, a (two-phase) brushless DC motor or a (two-phase) stepper motor. The motor may be a three-phase motor, such as an AC motor, a (three-phase) brushless DC motor, a permanent magnet synchronous motor (PMSM), a synchronous reluctance motor or a (three-phase) stepper motor. The motor may be a four-phase motor, such as a (four-phase) stepper motor.

A gate driver need not be used.

The adaptive controller need not be implemented in a microcontroller, but can be implemented in a system-on-a-chip, application specific integrated circuit (ASIC), digital signal processor (DSP) or other suitable form of integrated circuit.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. An adaptive control system for a plant, the adaptive control system comprising:
   a control system configured to generate drive signals for the plant in dependence upon a reference signal and an error signal;
   a state observer or state sensor configured to generate an estimate of a state of the plant in dependence upon the reference signal;
   an error combiner configured to selectably combine a first error signal determined from the reference signal and a set of measurements of the plant and a second error signal determined from the reference and the estimate so as to produce a third error signal which is provided as the error signal to the control system, wherein the error combiner is configured to pre-multiply the first error signal by a first gain and the second error signal by a second gain so as to obtain first and second amplified error signals respectively and to add the first and second amplified error signals to obtain the third error signal.

2. An adaptive control system according to claim 1, wherein, in a first or second enhanced mode, the error combiner is configured to set the first and second gains to respective non-zero, positive values.

3. An adaptive control system according to claim 2, wherein, in the first enhanced mode, the first and second gains are equal.

4. An adaptive control system according to claim 3, wherein the first and second gains are equal to one.

5. An adaptive control system according to claim 2, wherein, in the second mode, the first gain is equal to or greater than one, the second gain is equal to or greater than one, and the first gain and/or the second gain is greater than one.

6. An adaptive control system according to claim 1, wherein the control system comprises a field-orientated control system which comprises a speed regulator.

7. An adaptive control system according to claim 1, wherein the state observer or state sensor comprises a signal-based model reference adaptive control speed observer.

8. An adaptive control system according to claim 1, wherein the first error is determined from a speed reference $\omega_R$ and a plant speed $\omega_P$.

9. An adaptive control system according to claim 1, wherein the second error is determined from a speed reference $\omega_R$ and a speed estimate $\omega_E$.

10. An integrated circuit comprising:
    an adaptive control system according to claim 1.

11. An integrated circuit according to claim 10, further comprising:
    a CPU sub-system; and
    a peripheral module configured to provide the adaptive control system.

12. An integrated circuit according to claim 10, further comprising:
    a CPU sub-system comprising at least one processor and memory;
    wherein the CPU sub-system provides the adaptive control system.

13. An integrated circuit according to claim 10, which is microcontroller.

14. A system comprising:
    at least one plant; and
    at least one adaptive control system according to claim 1 arranged to control operation of the at least one plant.

15. A vehicle comprising a system according to claim 14.

16. A vehicle according to claim 14, which is an aerial vehicle, such as an unmanned aerial vehicle.

17. A vehicle according to claim 14, which is a ground vehicle, such as a motor vehicle.

18. An industrial system, such as a robot, comprising a system according to claim 14.

19. An appliance, such as a domestic appliance, a heating, ventilation and air conditioning appliance or power tool, comprising a system according to claim 14.

20. A system according to claim 14, wherein the plant comprises a brushless DC motor, a permanent-magnet synchronous motor or an AC induction motor.

21. A method of controlling a plant, the method comprising:
   generating drive signals for the plant in dependence upon a reference signal and an error signal; and
   generating an estimate of a state of the plant in dependence upon the reference signal;
   wherein generating the error signal comprises:
      generating a first amplified error signal by multiplying a first error signal determined from the reference signal and a set of measurements of the plan by a first gain;
      generating a second amplified error signal by multiplying a second error signal determined from the reference signal and the estimate by a second gain; and
      adding the first and second amplified error signals.

22. A hardware circuit configured to perform a method according claim 21.

23. A computer program product comprising a machine-readable medium storing thereon the computer program comprising instructions which, when executed by a computer, causes the computer to perform the method according to claim 21.

* * * * *